(12) United States Patent
Perasso et al.

(10) Patent No.: US 8,326,155 B2
(45) Date of Patent: Dec. 4, 2012

(54) WAVELENGTH DIVISION MULTIPLEX (WDM) OPTICAL DEMULTIPLEXER

(75) Inventors: Aldo Perasso, Genoa (IT); Massimo Speciale, Genoa (IT)

(73) Assignee: Ericsson AB, Stockholm (SE)

( * ) Notice: Subject to any disclaimer, the term of this patent is extended or adjusted under 35 U.S.C. 154(b) by 920 days.

(21) Appl. No.: 11/570,986

(22) PCT Filed: May 23, 2005

(86) PCT No.: PCT/EP2005/052353
§ 371 (c)(1), (2), (4) Date: Dec. 23, 2008

(87) PCT Pub. No.: WO2006/000506
PCT Pub. Date: Jan. 5, 2006

(65) Prior Publication Data
US 2009/0116840 A1    May 7, 2009

(30) Foreign Application Priority Data
Jun. 24, 2004 (IT) .............................. MI2004A1287

(51) Int. Cl.
*H04J 14/02* (2006.01)
(52) U.S. Cl. ................ 398/83; 398/79; 398/33; 398/38; 398/159; 398/160; 359/341.41; 359/341.42; 359/337; 385/24; 385/37
(58) Field of Classification Search .................. 398/79, 398/83, 177, 173, 180, 181, 158, 159, 160, 398/38, 33, 59; 359/341.41, 341.42, 337, 359/337.11; 385/24, 37, 14, 31
See application file for complete search history.

(56) References Cited

U.S. PATENT DOCUMENTS
5,870,217 A   2/1999  Itou et al.
6,144,487 A  11/2000  Michishita et al.
(Continued)

FOREIGN PATENT DOCUMENTS
EP    1076434    2/2001
(Continued)

*Primary Examiner* — Hanh Phan
(74) *Attorney, Agent, or Firm* — Coats & Bennett, P.L.L.C.

(57) ABSTRACT

An optical demultiplexer (13, 30) for wavelength division multiplex WDM optical radiation comprising a plurality of wavelength channels ($Ch_1 \ldots Ch_{16}$) spaced over a wavelength spectrum said demultiplexer being for separating the WDM radiation into individual wavelength channels is described. The demultiplexer comprises a first demultiplexer (12) for dividing the W-DM radiation into a plurality of sub-bands ($Ch_1 \ldots Ch_4, Ch_5 \ldots Ch_8, Ch_9 \ldots Ch_{12}, Ch_{13} \ldots Ch_{16}$) each comprising a plurality of adjacent wavelength channels and each of which appears at a respective output (13) of the demultiplexer (12), and one or more demultiplexer arrangement (30) for separating each sub-band into individual wavelength channels each of which appears at a respective output (20) and is characterised in that the or each demultiplexer arrangement (30) comprises an optical amplifier (15) for optically amplifying all channels of the sub-band; a demultiplexer (16) for separating the channels of the sub-band such that each to appears at a respective output (20); power monitoring means (18) for measuring the power ($P_1 \ldots P_4$) of each wavelength channel ($Ch_1 \ldots Ch_4$) at the respective output; and control means (34) for controlling operation of the optical amplifier (15) in dependence on the measured power of each wavelength channel such as control the power of each wavelength channel to a predetermined power level.

10 Claims, 1 Drawing Sheet

U.S. PATENT DOCUMENTS

Figure 1:
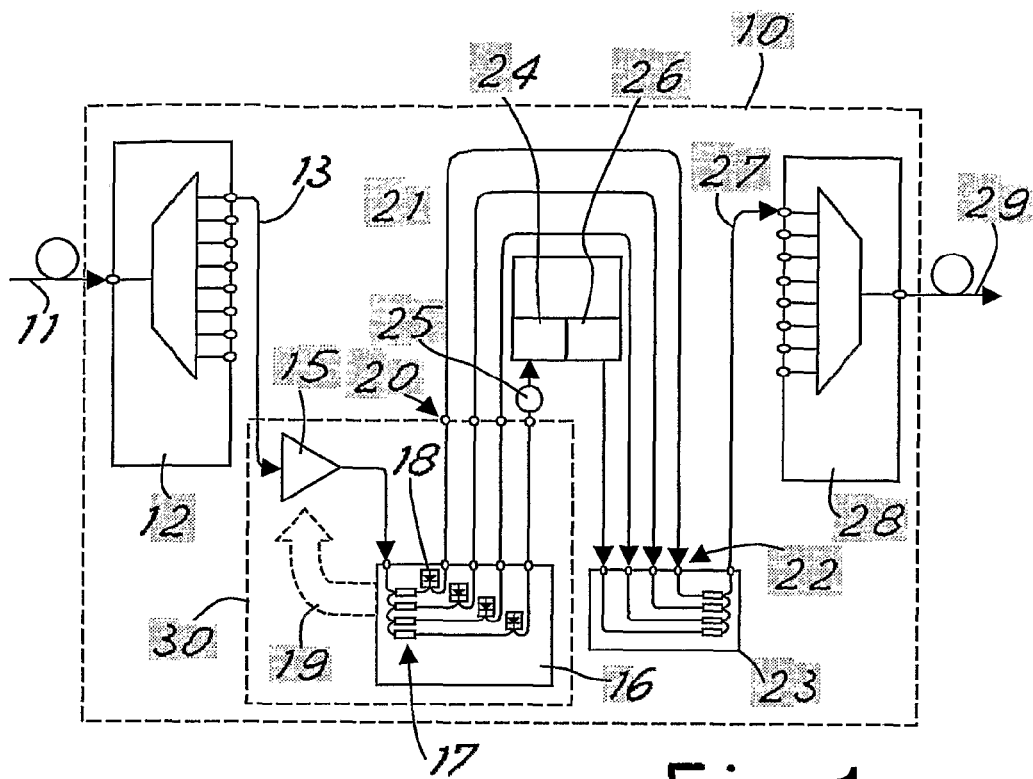

| | | | |
|---|---|---|---|
| 6,243,179 B1 * | 6/2001 | Thompson et al. | 398/9 |
| 6,323,994 B1 * | 11/2001 | Li et al. | 359/341.1 |
| 6,493,117 B1 * | 12/2002 | Milton et al. | 398/49 |
| 6,507,431 B1 | 1/2003 | Sugaya et al. | |
| 6,941,079 B1 * | 9/2005 | Barozzi et al. | 398/157 |
| 2002/0048066 A1 * | 4/2002 | Antoniades et al. | 359/128 |

FOREIGN PATENT DOCUMENTS

| | | |
|---|---|---|
| JP | 10285143 | 10/1998 |
| JP | 2002260400 | 9/2002 |

* cited by examiner

WAVELENGTH DIVISION MULTIPLEX (WDM) OPTICAL DEMULTIPLEXER

The present invention relates to a Wavelength Division Multiplex (WDM) optical demultiplexer (DEMUX) and an Optical Add Drop Multiplexer (OADM) node incorporating said demultiplexer. More particularly, though not exclusively, the invention concerns an OADM for use in a METRO (Metropolitan area) network.

As is known a WDM optical network comprises a plurality of nodes that are interconnected by optical waveguiding means, typically optical fibres, for guiding WDM optical signals. At each node one or more selected wavelength channels can be added or dropped to provide routing of WDM optical signals between nodes based on the wavelength channel.

One network topography, often termed a ring configuration, is one in which the nodes are connected by the optical fibres in a point-to-point serial manner in an unbroken loop or ring configuration. At each node an Optical Add Drop Multiplexer (OADM) is used to add selected wavelength channel/s to, and drop selected wavelength channel/s from, WDM radiation guided by the transmission fibre interconnecting nodes of the network.

One known OADM comprises demultiplexing and multiplexing modules. The demultiplexing module separates (de-multiplexes) the WDM signal received from the network into individual wavelength channels or groups of adjacent wavelength channels (sub-bands) which then appear at respective output (DROP) ports of the module. Typically the demultiplexing module comprises an array of optical filters (DROP filters) and the multiplexing module one or more ADD filters. The multiplexing module is used for multiplexing wavelength channels applied to its input (ADD) ports. With such an OADM when it is desired to optically pass-through one or more selected wavelength channels through the node (through-channels) to connect the appropriate optical DROP ports of the demultiplexing module to the corresponding optical ADD port/s of the multiplexing module using an optical fibre patchcord (a length of optical fibre). A major limitation of such OADM is the sum of the filter losses in the path for through-channels (through- channels have to pass through a number of DROP filters) reduces the optical launch power into the ADD filter of through channel/s compared to other wavelength channels being added at the node which have directly generated by an optical transmitter (typically the desired launch power is 0 dBm). To overcome this problem it is known for the node to include optical amplification of through-channels. In one arrangement an optical amplifier is provided on a "per channel basis. To reduce the number of optical amplifiers it has been proposed to provide a single optical amplifier per sub-band (a group of wavelength channels from the total number of WDM channels) and to then level the power of each channel of the sub-band using a respective variable optical attenuator (VOA).

However for Metropolitan (METRO) networks economic considerations make an amplification architecture on a 'per channel' basis or even a single optical amplifier per sub-band prohibitively expensive. For this reason, the current sub-bands practice does not allow the single-channel amplified optical pass-through at an affordable cost as required in METRO networks.

The present invention has arisen in an endeavour to provide a demultiplexer and an Add-Drop node in an optical network allowing the optical pass-through operation while keeping the correct channel powers that at least in part overcomes the above-mentioned shortcomings.

In accordance with the invention there is provided an optical demultiplexer for wavelength division multiplex WDM optical radiation comprising a plurality of wavelength channels spaced over a wavelength spectrum said demultiplexer being for separating the WDM radiation into individual wavelength channels and comprising a first demultiplexer for dividing the WDM radiation into a plurality of sub-bands each comprising a plurality of adjacent wavelength channels and each of which appears at a respective output of the demultiplexer, and one or more demultiplexer arrangement for separating each sub-band into individual wavelength channels each of which appears at a respective output, characterised in that the or each demultiplexer arrangement comprises an optical amplifier for optically amplifying all channels of the sub-band; a demultiplexer for separating the channels of the sub-band such that each to appears at a respective output; power monitoring means for measuring the power of each wavelength channel at the respective output; and control means for controlling operation of the optical amplifier in dependence on the measured power of each wavelength channel such as control the power of each wavelength channel to a predetermined power level.

Preferably, the optical amplifier comprises an Erbium Doped Fibre Amplifier (EDFA) and the control means is operable to control a pump current $I_p$ to the EDFA to control the gain of the amplifier to control the power of each wavelength channel to the predetermined power level. Alternatively, the optical amplifier can include a variable attenuation optical attenuator and the control means is operable to control the attenuation of the attenuator to control the power of each wavelength channel to the predetermined power level.

Preferably, the or each demultiplexer arrangement further includes a variable optical attenuator before the input of the optical amplifier and the control means is further operable to control the attenuation of the attenuator to control the power of each wavelength channel to the predetermined power level.

Conveniently the control means comprises a microcontroller that is operable to receive signals corresponding to the measured powers of the wavelength channels and to generate a control signal for controlling the optical amplifier. Advantageously, the microcontroller is further operable to receive signals corresponding to the input power to and output power from the optical amplifier to calculate the power gain of the amplifier. Moreover, the microcontroller is operable to send a command signal to the input attenuator and is preferably operable to control the variable input attenuator to limit the gain variations of the optical amplifier calculated on the basis of input and output powers of the optical amplifier and to keep any gain variation within predetermined operational conditions.

In accordance with a second aspect of the invention there is provided An Optical Add Drop Multiplexer (OADM) incorporating the demultiplexer in accordance with the first aspect of the invention and further comprising one or more multiplexer for combining wavelength channels applied to inputs into sub-bands and a multiplexer for combining the sub-bands into WDM radiation for output from the OADM, wherein through-channels are routed through the OADM by optically connecting respective outputs of the demultiplexer to corresponding inputs of the multiplexer.

Figure 2:
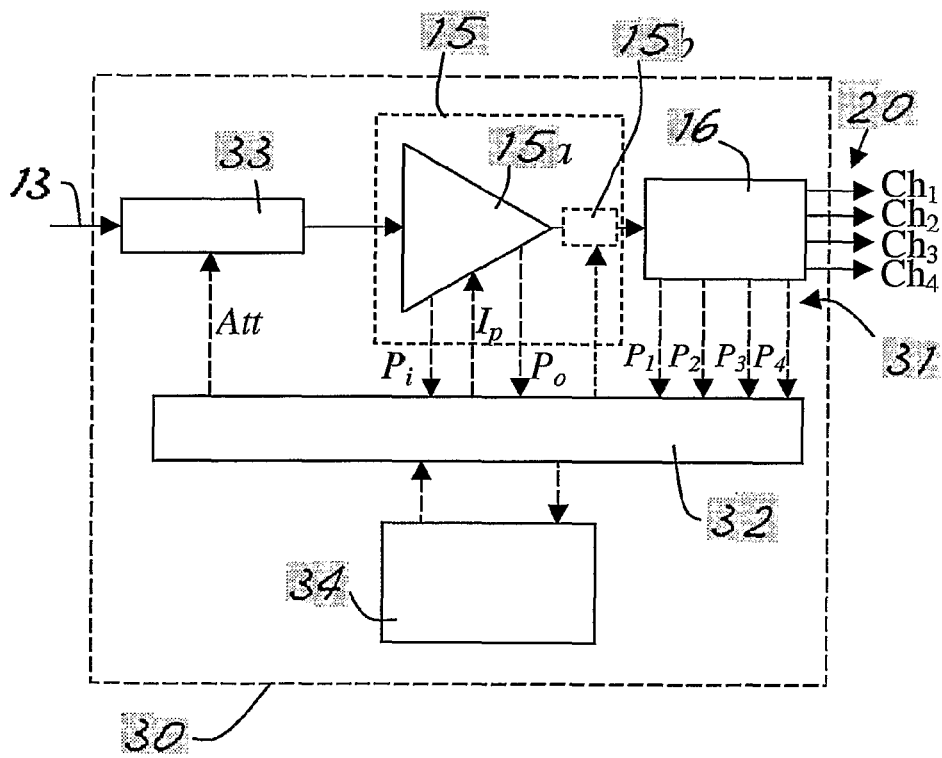

In order that the invention is better understood an OADM in accordance with the invention will now be described, by way of example only, with reference to the accompanying drawings in which:

FIG. 1 is a block diagram of a node of an WDM optical network incorporating an OADM in accordance with the invention: and FIG. 2 is a block diagram of a demultiplexer in accordance with the invention.

Referring to FIG. 1 there is shown a block diagram of an OADM in accordance with the invention for use in a node 10 of a METRO WDM ring network. By way of example the network is a Dense Wavelength Division Multiplex (DWDM) optical network comprising sixteen wavelength channels ($\lambda_1$ to $\lambda_{16}$) which are spaced at 200 Ghz and in which each wavelength channel (optical carrier) is modulated with a 10 Gb/s communication traffic. It will be appreciated however, that the invention is applicable to other WDM network architectures and networks comprising a different number of and/or channel spacing. In the following description the DEMUX arrangement in accordance with the invention allows a single wavelength channel to be dropped/added or regenerated and three wavelength channels to pass-through.

An optical fibre 11 comprising a link of the network (not shown) is connected to a known optical demultiplexer 12 which divides the incoming WDM spectrum into sub-bands, that is groups of adjacent wavelength channels. For ease of fabrication the demultiplexer 12 is advantageously a readily available 1:8 Coarse Wavelength Division Multiplexing (CWDM) DEMUX module that divides the WDM spectrum into eight sub-bands although only the C and L bands will be considered in the example described. As a result the sixteen DWDM channels are divided into four sub-bands of four channels each e.g. $Ch_1 \ldots Ch_4$, $Ch_5 \ldots Ch_8$, $Ch_9 \ldots Ch_{12}$, $Ch_{13} \ldots Ch_{16}$ with carrier wavelengths $\lambda_1 \ldots \lambda_4, \lambda_5 \ldots \lambda_8, \lambda_9 \ldots \lambda_{12}, \lambda_{13} \ldots \lambda_{16}$ respectively. The CWDM DEMUX has eight optical outputs $13_1 \ldots 13_8$ with the four sub-bands appearing at outputs $13_1 \ldots 13_4$.

The DEMUX architecture 30 in accordance with the invention for a single sub-band ($Ch_1 \ldots Ch_4$) is now described, for example, RED C band around $\lambda=1551$ nm, which is amplified independently from the rest of the WDM spectrum/sub-bands. This sub-band is taken from the corresponding output $13_1$ of the CWDM DEMUX 12 and optically amplified by an optical amplifier 15 that advantageously comprises an Erbium Doped Fibre Amplifier (EDFA).

The output of the optical amplifier 15 is applied to the input of a 1:4 DWDM DEMUX 16 which separates the individual channels of the sub-band and emits each channel from a respective output (DROP port) 20. The DWDM DEMUX 16 comprises known filters (DROP filters) 17 for spatially separating the channels and Integrated Power Monitors (IPM) 18 connected to the filter outputs for monitoring for the presence of each channel and for measuring the power level of each channel.

The power level data from the IPMs is used in a feedback arrangement 19 to control operation of the amplifier 15 so as to compensate for the link losses and to ensure substantially the same output optical power of approximately 0 dBm for each channel at each DROP port 20. The amplifier feedback control arrangement is described in detail with reference to FIG. 2.

It will be appreciated that the combination of DWDM DEMUX 16 and optical amplifier 15 which is controlled in dependence on the measured powers of the channels enables a demultiplexer 30 to be implemented using a single amplifier which is capable of providing channel power equalization or leveling.

Each channel appearing at a respective DROP port 20 can either be passed-through the node and back to the network or received (dropped) at the node. In the case of the former a channel can be optically passed-through the node by optically connecting the DROP port 20 of the demultiplexer 16 to a corresponding ADD port (input) 22 of a multiplexer 23 using an optical fibre patchcord 21. In the example illustrated in FIG. 1 the multiplexer 23 is a 4:1 DWDM MUX and three of the channels ($Ch_1 \ldots Ch_3$) of the sub-band are passed-through by a respective optical fibre. When it is desired to drop a channel ($Ch_4$ in FIG. 1) the DROP port 20 is connected directly to a receiver (RX) 24 for example a 10 Gb/s PiN (Positive-Intrinsic-Negative) junction photo-detector. To ensure the correct channel power level at the receiver 24 it is advantageous to pass the channel through a fixed attenuation optical attenuator 25 to reduce the power from 0 dBm to a level suited to the receiver. In the embodiment illustrated in FIG. 1 a single channel ($Ch_4$) of the sub-band is received.

In a similar manner, channels that are to be added at the node, and which have been generated for example by a transmitter (TX) 26, are optically connected to a respective ADD port 22 of the DWDM MUX 23. The transmitter advantageously includes an Electro-Absorption Modulator (EAM) for modulating the optical carrier generated by a to laser module. A channel can be regenerated by dropping the channel to the receiver 24 and using the detected signal to operate the EAM of the transmitter 25.

The DWDM MUX 23 combines the four channels (three pass-through $Ch_1 \ldots Ch_3$ and one ADD channel $Ch_4$) to form a sub-band which is then applied to a respective input 27 of an 8:1 CWDM MUX 28. The CWDM MUX 28 combines the sub-bands to form a WDM radiation which is output from the node on a optical fibre 29 which constitutes the next link of the network. In this example there are sixteen wavelength channels and four sub-bands though for ease of fabrication an 8:1 MUX is used of which four inputs $27_1 \ldots 27_4$ will be unused.

In accordance with the invention by monitoring the power of each of the channels regardless of whether the channel is ultimately dropped/regenerated or passed-through enables complete management of the output power of each channel. The self-leveling demultiplexer arrangement 30 with a single amplifier per sub-band of the invention allows implementation an OADM ring without the need for many expensive VOAs (c.f. known OADMs typically require one VOA in the optical transmitter TX and one VOA in the optical receiver RX for each channel) and prohibitively expensive DWDM optical cards equipped with Mach-Zehnder Modulators (MZM) in the optical transmitter and Avalanche Photo-Detector (APD) optical receiver. In contrast the invention enables the use of relatively less expensive Electro-Absorption Modulator (EAM) within the transmitter TX and use of PiN photodetectors in the receiver RX. The demultiplexing arrangement 30 of the invention overcomes the limitations of the connectivity problems of the known sub-band OADM arrangements due to the optical pass-through and channel equalization on a "per channel" basis.

It will be appreciated that whilst the foregoing description has been with reference to a single sub-band ($Ch_1 \ldots Ch_4$) the demultiplexing arrangement 30 can likewise be used for the remaining sub-bands with a respective demultiplexing arrangement being provided for each sub-band and connected between a respective output 13 and input 22 of the CWDM DEMUX 12 and DWDM MUX 23.

Referring to FIG. 2 there is shown a block representation of the demultiplexer arrangement 30 incorporating the self-leveling amplifier arrangement. Within this Figure dashed lines are used to indicate connections carrying electrical signals and solid lines to indicate connections carrying optical signals. The DWDM DEMUX 16 includes respective outputs 31 for each of the integrated power monitors 18 that output the measured powers values $P_1, P_2, P_3, P_4$ for each of the channels $Ch_1, Ch_2, Ch_3, Ch_4$. These measured power values are converted to digital values representative of the power by a applying the measured power values to the A/D conversion inputs of a known ADC/DAC (Analogue To Digital/Digital To Analogue) interface device 32. The optical amplifier 15 includes integrated power monitors for measuring overall optical input power $P_i$ and output power $P_o$ to the amplifier and these measured values are also converted to digital data values by the ADC/DAC device 32.

A D/A conversion output of the device 32 is connected to the amplifier for sending an $I_p$ value for control of the amplifier pump current. Between the input of the sub-band and the amplifier 15 a VOA 33 is provided whose attenuation is controlled by an signal Att emitted by another D/A conversion output of the device 32.

The ADC/DAC interface device 32 is connected to a microcontroller 34 which is programmed to perform the processing of the input signals $P_1$, $P_2$, $P_3$, $P_4$, $P_i$ and $P_o$ from the interface device vice to generate the control signals Att and $I_p$.

In operation the microcontroller controls the output power ($P_1 \ldots P_4$) of the four channels ($Ch_1 \ldots Ch_4$) to ensure that each stays within a specified launch power range typically 0 dBm under all conditions. The microcontroller optimizes the pump current $I_p$ of the amplifier 15 and the optical attenuation of the VOA 33 to achieve the aforementioned conditions. The signals $P_1 \ldots P_4$ are utilized for both detecting for the presence of each of the channels and for providing feedback for controlling the output power of the channels.

A substantially flat gain over the entire sub-band is obtained by a suitable design of the EDFA 15 and by limiting any variation in the gain ($P_o/P_i$) of the amplifier over its operating conditions by suitable control of the attenuation of the input VOA 33. For example, for a typical METRO OADM ring application, it is possible to achieve a gain flatness of less than +/−0.5 dB in the RED C band (1551 nm +/−7 nm) without using a Gain Flattening Filter (GFF) with a single pump EDFA controlled in Po and a gain variation from 17 to 30 dB with a 5 dB noise figure.

Amplifiers of similar performance in other bands require a slightly more complex architectures (e.g. use of Gain Flattening Filters etc) that will be readily imaginable to those skilled in the art Where it is required to achieve a more precise gain flatness (for example +/−0.2 dB) the optical amplifier 15 can further include a VOA 15b connected between the output of the EDFA 15a and the input of the DWDM DEMUX 16. The attenuation of the VOA 15b is used to control the overall output power instead of varying the EDFA pump current $I_p$ which is kept constant to maintain the gain of EDFA over the entire optical band of interest.

Use of 10 Gb/s optical cards which utilize EAM lasers in the transmitter TX, ensures a very small variation in launch power at the transmitter (typically it is found that the launch power varies from 0 to +2 dBm under all conditions).

The combination of a good amplifier gain flatness and a limited variation in launch power eliminates the need for VOAs on both the transmitter and the receiver side of each optical card thereby substantially reducing the insertion loss of the node and as importantly the cost. It is found that use of an OADM in accordance with the invention enables METRO OADM rings of up to six nodes (with five optical pass-throughs) which are more than 200 km long.

Another advantage of the single-amplifier self-leveling demultiplexer in accordance with the present invention is that it can use less costly PiN photodetectors in the 10 Gb/s receiver cards.

In addition to performing the above mentioned control functions, the microcontroller is configured to detect and handle various failure conditions such as, for example:

loss of input signal which is detected when Pi falls below a predetermined minimum value $P_{i\_minimum}$;

excessive input power which is detected when $P_i$ becomes greater than a predetermined maximum value $P_{i\_maximum}$;

gain of the amplifier $P_o/P_i$ is outside a specified range required to ensure the required gain flatness of the amplifier;

output power of any channel ($P_1$ or $P_2$ or $P_3$ or $P_4$) is outside a specified launch power range; and lack of presence of channels detected when the powers $P_1$, $P_2$, $P_3$, $P_4$ are lower than a specified threshold.

Depending on the failure condition detected, the microcontroller can make various decisions to intervene. For example, if the microcontroller detects loss of the input signal, it can advantageously shut off the pump current $I_p$ of the amplifier 15 and then manage a smooth power-up sequence when the input power $P_i$ is once again detected as being above the predetermined minimum value. Such an arrangement avoids optical power transients on the channels $Ch_1 \ldots Ch_4$.

It is now clear that purpose of the present invention have been achieved by making to available a solution allowing with a single optical amplifier compensation of the optical connection and losses in the Add-Drop filters whilst maintaining a good equalization of the channels within a CWDM sub-band. This allows OADM with channel pass-through and self-leveling of channel power at accost low enough for use within Metro ring networks.

The invention claimed is:

1. An optical demultiplexer for separating wavelength division multiplex (WDM) optical radiation having a plurality of wavelength channels spaced over a wavelength spectrum into individual wavelength channels, the optical demultiplexer comprising:

a first demultiplexer configured to divide WDM optical radiation into a plurality of sub-bands, each sub-band comprising a plurality of adjacent wavelength channels and being emitted at a respective first demultiplexer output;

one or more demultiplexer arrangements configured to separate each sub-band into individual wavelength channels, each individual wavelength channel being emitted at a respective demultiplexer arrangement output, and each demultiplexer arrangement comprising:

an optical amplifier configured to optically amplify all the adjacent wavelength channels in a sub-band;

a demultiplexer configured to separate each of the adjacent wavelength channels into the individual wavelength channels such that each individual wavelength channel is emitted at a respective demultiplexer arrangement output;

a power monitor configured to measure the power of each individual wavelength channel at its respective demultiplexer arrangement output; and a controller configured to control the optical amplifier based on the measured power of the individual wavelength channels such that the power of each individual wavelength channel remains substantially at a predetermined power level.

2. The optical demultiplexer of claim 1 wherein the optical amplifier comprises an Erbium Doped Fibre Amplifier (EDFA), and wherein the controller is further configured to control a pump current $I_p$ to the EDFA to control an EDFA gain such that the power of each individual wavelength channel remains substantially at the predetermined power level.

3. The optical demultiplexer of claim 1 wherein the optical amplifier comprises a variable attenuation optical attenuator, and wherein the controller is further configured to control the attenuation of the attenuator such that the power of each individual wavelength channel remains substantially at the predetermined power level.

4. The optical demultiplexer of claim 1 wherein each demultiplexer arrangement further comprises a variable optical attenuator disposed prior to the optical input of the optical amplifier, and wherein the controller is further configured to control attenuation of the variable optical attenuator such that the power of each individual wavelength channel remains substantially at the predetermined power level.

5. The optical demultiplexer of claim 4 wherein the microcontroller is further configured to send a command signal to the variable optical attenuator.

6. The optical demultiplexer of claim 5 wherein the microcontroller is further configured to control the variable input attenuator to limit gain variations of the optical amplifier calculated based on the input and output power of the optical amplifier, and to maintain a given gain variation within a predetermined operating condition.

7. The optical demultiplexer of claim 1 wherein the controller comprises a microcontroller configured to receive signals corresponding to the measured power of each individual wavelength channel, and wherein the microcontroller is further configured to generate a control signal to control the optical amplifier.

8. The optical demultiplexer of claim 7 wherein the microcontroller is further configured to receive signals indicating the power of the wavelength channels at the optical input and the optical output of the optical amplifier, and to calculate the power gain of the amplifier.

9. An Optical Add Drop Multiplexer (OADM) comprising:
   a first demultiplexer configured to divide an input WDM optical radiation into a first plurality of sub-bands, each comprising a plurality of adjacent wavelength channels and being emitted at a respective first demultiplexer output;
   one or more demultiplexer arrangements configured to separate each of the first plurality of sub-bands into individual wavelength channels, each demultiplexer arrangement comprising:
      an optical amplifier configured to optically amplify all adjacent wavelength channels in each of the first plurality of sub-bands;
      a second demultiplexer configured to separate each of the adjacent wavelength channels into the individual wavelength channels such that each individual wavelength channel is emitted at a respective demultiplexer arrangement output;
      a power monitor configured to measure the power of each individual wavelength channel at its respective demultiplexer arrangement output; and
      a controller configured to control the optical amplifier based on the measured power of each individual wavelength channel such that the power of each individual wavelength channel remains substantially at a predetermined power level;
   a first multiplexer configured to combine individual wavelength channels into a second plurality of sub-bands;
   a second multiplexer configured to combine the second plurality of sub-bands into WDM optical radiation for output from the OADM; and
   one or more through-channels routed through the OADM, each through channel optically connecting respective second demultiplexer outputs to corresponding first multiplexer inputs.

10. An optical demultiplexer for separating wavelength division multiplex (WDM) optical radiation having a plurality of wavelength channels spaced over a wavelength spectrum into individual wavelength channels, the optical demultiplexer comprising:
   a first demultiplexer configured to divide WDM optical radiation into a plurality of sub-bands, each sub-band comprising a plurality of adjacent wavelength channels and being emitted at a respective first demultiplexer output;
   one or more demultiplexer arrangements configured to separate each sub-band into individual wavelength channels, each individual wavelength channel being emitted at a respective demultiplexer arrangement output, and each demultiplexer arrangement comprising:
      an optical amplifier configured to optically amplify all the adjacent wavelength channels in a sub-band;
      a demultiplexer configured to separate each of the adjacent wavelength channels into the individual wavelength channels such that each individual wavelength channel is emitted at a respective demultiplexer arrangement output;
      a power monitor configured to measure the power of each individual wavelength channel at its respective demultiplexer arrangement output; and
      a controller configured to control the optical amplifier based on the measured power of the individual wavelength channels such that the power of each individual wavelength channel remains substantially at a predetermined power level; and
   wherein the optical amplifier comprises a variable attenuation optical attenuator, and wherein the controller is further configured to control the attenuation of the attenuator such that the power of each individual wavelength channel remains substantially at the predetermined power level.

* * * * *

UNITED STATES PATENT AND TRADEMARK OFFICE
CERTIFICATE OF CORRECTION

PATENT NO. : 8,326,155 B2
APPLICATION NO. : 11/570986
DATED : December 4, 2012
INVENTOR(S) : Perasso et al.

It is certified that error appears in the above-identified patent and that said Letters Patent is hereby corrected as shown below:

On the Title Page, in Field (57), under "ABSTRACT", in Column 2, Line 7, delete "W-DM" and insert -- WDM --, therefor.

In Column 1, Line 36, delete "channels" and insert -- channel/s --, therefor.

In Column 1, Line 38, delete "ports" and insert -- port/s --, therefor.

In Column 4, Line 18, delete "to laser" and insert -- laser --, therefor.

In Column 5, Line 40, delete "art" and insert -- art. --, therefor.

In Column 6, Line 22, delete "making to" and insert -- making --, therefor.

Signed and Sealed this
Ninth Day of April, 2013

Teresa Stanek Rea
*Acting Director of the United States Patent and Trademark Office*